(12) United States Patent
Burt et al.

(10) Patent No.: US 7,559,385 B1
(45) Date of Patent: Jul. 14, 2009

(54) RUGGEDIZED ROBOTIC VEHICLES

(75) Inventors: Ian T. Burt, Edina, MN (US); Nikolaos P. Papanikolopoulos, Minneapolis, MN (US)

(73) Assignee: Regents of the University of Minnesota, St. Paul, MN (US)

( * ) Notice: Subject to any disclaimer, the term of this patent is extended or adjusted under 35 U.S.C. 154(b) by 586 days.

(21) Appl. No.: 11/073,790

(22) Filed: Mar. 7, 2005

Related U.S. Application Data

(60) Provisional application No. 60/552,010, filed on Mar. 10, 2004.

(51) Int. Cl.
*B60K 1/00* (2006.01)
*B62D 61/00* (2006.01)

(52) U.S. Cl. ............................ 180/65.1; 180/167; 901/1

(58) Field of Classification Search ................. 180/167, 180/218, 368, 65.1, 65.6; 901/1; 301/5.308
See application file for complete search history.

(56) References Cited

U.S. PATENT DOCUMENTS

| | | | |
|---|---|---|---|
| 1,408,885 A | 3/1922 | Humphrey |
| 2,818,301 A | 12/1957 | Hayden |
| 4,300,308 A | 11/1981 | Ikeda |
| 4,334,221 A | 6/1982 | Rosenhagen et al. |
| 4,402,158 A | 9/1983 | Seki et al. |
| 4,406,085 A | 9/1983 | Rhodes |
| 4,443,968 A | 4/1984 | Law |
| 4,572,530 A | 2/1986 | Marino |
| 4,575,304 A | 3/1986 | Nakagawa et al. |
| 4,648,853 A | 3/1987 | Siegfried |
| 4,736,826 A | 4/1988 | White et al. |
| 4,773,889 A | 9/1988 | Rosenwinkel et al. |
| 4,899,945 A | 2/1990 | Jones |
| 4,906,051 A | 3/1990 | Vilhauer, Jr. |
| 4,913,458 A | 4/1990 | Hamilton |

(Continued)

FOREIGN PATENT DOCUMENTS

GB        2194457 A        3/1988

(Continued)

OTHER PUBLICATIONS

Balch et al., "Behavior-based Formation Control for Multi-robot Teams," *IEEE Transactions on Robotics and Automation*, 1998;14(6):1-15.

(Continued)

*Primary Examiner*—Frank B Vanaman
(74) *Attorney, Agent, or Firm*—Mueting Raasch & Gebhardt, P.A.

(57) ABSTRACT

A miniature, rugged robotic vehicle suitable for a variety of tasks including covert surveillance and reconnaissance. The vehicle may include a unitary single-piece chassis that provides structural rigidity to the vehicle and protection of onboard equipment. The vehicle may be configured to be thrown or dropped into an intended target site from a remote location. In one embodiment, the vehicle may include a wheel assembly having a tire with shock absorption capabilities in both radial and axial directions to cushion the vehicle from impact loads experienced during delivery. In some embodiments, the wheel assemblies may couple to a drive motor assembly of the vehicle via a clutch assembly that permits slippage between components to reduce potential damage to drive train components.

7 Claims, 12 Drawing Sheets

U.S. PATENT DOCUMENTS

| | | | |
|---|---|---|---|
| 4,993,912 A | | 2/1991 | King et al. |
| 5,129,709 A | * | 7/1992 | Klamer .................... 301/5.302 |
| 5,241,380 A | | 8/1993 | Benson et al. |
| 5,350,033 A | | 9/1994 | Kraft |
| 5,473,364 A | | 12/1995 | Burt |
| 5,487,692 A | | 1/1996 | Mowrer et al. |
| 5,551,545 A | | 9/1996 | Gelfman |
| 5,554,914 A | | 9/1996 | Miyazawa |
| 5,576,605 A | | 11/1996 | Miyazawa |
| 5,596,255 A | | 1/1997 | Miyazawa |
| 5,610,488 A | | 3/1997 | Miyazawa |
| 5,721,691 A | | 2/1998 | Wuller et al. |
| 5,732,074 A | | 3/1998 | Spaur et al. |
| 5,759,083 A | | 6/1998 | Polumbaum et al. |
| 5,762,533 A | * | 6/1998 | Tilbor et al. ................. 446/466 |
| 5,839,795 A | | 11/1998 | Matsuda et al. |
| 5,888,135 A | | 3/1999 | Barton, Jr. et al. |
| 5,908,454 A | | 6/1999 | Zyburt et al. |
| 6,046,565 A | * | 4/2000 | Thorne ....................... 318/587 |
| 6,066,026 A | * | 5/2000 | Bart et al. ................... 446/460 |
| 6,101,951 A | | 8/2000 | Sigel |
| 6,109,568 A | | 8/2000 | Gilbert et al. |
| 6,199,880 B1 | | 3/2001 | Favorito et al. |
| 6,322,088 B1 | | 11/2001 | Klamer et al. |
| 6,502,657 B2 | | 1/2003 | Kerrebrock et al. |
| 6,548,982 B1 | | 4/2003 | Papanikolopoulos et al. |
| 6,574,536 B1 | * | 6/2003 | Kawagoe et al. .............. 701/23 |
| 6,860,346 B2 | | 3/2005 | Burt et al. |
| 2003/0137268 A1 | | 7/2003 | Papanikolopoulos et al. |
| 2004/0000439 A1 | | 1/2004 | Burt et al. |

FOREIGN PATENT DOCUMENTS

| | | |
|---|---|---|
| JP | 63-269701 | 11/1988 |
| JP | 10-69314 | 3/1998 |

OTHER PUBLICATIONS

Burgard et al., "Collaborative Multi-Robot Exploration," *IEEE International Conference on Robotics and Automation (ICRA)*, 2000; 5 pgs.

Cao et al., "Cooperative Mobile Robotics: Antecedents and Directions," *Autonomous Robots*, 1997; 4:7-27.

Carts-Powell, "Spring-loaded spies," [online]; *New Scientist*, retrieved from the Internet on Jan. 4, 2000 at: <URL:www.newscientist.com/ns/19991113/newsstory1.html>, 3 pgs.

Chemel et al., "Cyclops: Miniature Robotic Reconnaissance System," *Proceedings of the 1999 IEEE International Conference on Robotics & Automation*, May 1999, Detroit, MI; 2298-2302.

Clocky, MSNBC, "Hit snooze and this alarm clock runs and hides," [online]; Updated Mar. 22, 2005, retrieved from the Internet on Dec. 10, 2005 at: <URL:www.msnbc.msn.com/id/7268066/>, 3 pgs.

Clocky™, [online]; retrieved from the Internet on Dec. 2, 2005 at: <URL:www.clocky.net/html>; website available at least as early as Mar. 25, 2005, 1 pg.

Defense Advanced Research Projects Agency (DARPA), "Distributed Robotics," [online]; retrieved from the Internet on Jan. 4, 2000 at: <URL:www.darpa.mil/MTO/DRobotics/index.html>, 2 pgs.

Defense Advanced Research Projects Agency (DARPA), "Distributed Robotics Using Reconfigurable Robots," [online]; retrieved from the Internet on Jan. 4, 2000 at: <URL:www.darpa.mil/MTO/DRobotics/98DROverviews/university-10.html>, 2 pgs.

Dillmann et al., "PRIAMOS: An Advanced Mobile System for Service, Inspection, and Surveillance Tasks," *Modelling and Planning for Sensor Based Intelligent Robot Systems*, vol. 21 of *Series in Machine Perception and Artificial Intelligence*, World Scientific, Singapore; 1995, 22 pgs.

Drenner et al., "Mobility Enhancements to the Scout Robot Platform," *Proceedings of the 2002 IEEE International Conference on Robotics and Automation*, Washington, DC, May 11-15, 2002, 1069-1074.

Drenner et al., "Communication and Mobility Enhancements to the Scout Robot," *Proceedings of the 2002 IEEE/RSJ International Conference on Intelligent Robots and Systems*, EPFL Lausanne, Switzerland, Sep. 30-Oct. 4, 2002; 1:865-870.

Drenner et al., "Increasing the Scout's Effectiveness Through Local Sensing and Ruggedization," *Proceedings of the 2004 IEEE International Conference on Robotics and Automation*, Apr. 2004, New Orleans, LA, 1406-1411.

Eisler et al., "Cooperative Control of Vehicle Swarms for Acoustic Target Recognition by Measurement of Energy Flows," Sandia National Laboratories, manuscript received Feb. 1, 2002, Albuquerque, NM; 4 pgs.

Elfes, "Using Occupancy Grids for Mobile Robot Perception and Navigation," *IEEE Computer*, 1989; 22(6):46-57.

Everett et al., "From Laboratory to Warehouse: Security Robots Meet the Real World," *International Journal of Robotics Research*, 1999; 18(7):760-768.

Feddema et al., "Decentralized Control of Cooperative Robotic Vehicles: Theory and Application," *IEEE Transactions on Robotics and Automation*, 2002; 18(5):852-864.

Fox et al., "Collaborative Multi-Robot Localization", *Proc. of the German Conference on Artificial Intelligence (K1)*, Germany; date unknown; 12 pgs.

Fox et al., "A Probabilistic Approach to Collaborative Multi-Robot Localization," *Autonomous Robots*, 2000; 8(3):325-344.

Kajiwara et al., "Development of a Mobile Robot for Security Guard," *Proceedings of the 15th Intl. Symposium on Industrial Robots*, Tokyo, Japan, 1985; 1:271-278.

Kochan, "HelpMate to ease hospital delivery and collection tasks, and assist with security," *Industrial Robot*, 1997; 24(3):226-228.

Matarić, "Behaviour-based conrol: examples from navigation, learning, and group behaviour," *J. Expt. Theor. Artif. Intell.*, 1997; 9:323-336.

Nakamura et al., "Team Description of the RoboCup-NAIST," RoboCup-99 Team Descriptions, Middle Robots League, Team NAIST, 1999; 170-174.

Omitech Robotics, "Toughbot," picture available at least as early as Mar. 22, 2005, 1 pg.

Orwig, "Cybermotion's Roving Robots," *Industrial Robot*, 1993; 20(3):27-29.

Osipov et al., "Mobile robots for security," *Proceedings of the 1996 2nd Specialty Conference on Robotics for Challenging Environments*, RCE-II, Albuquerque, NM, 1996; 290-295.

PackBot, iRobot, product description, Milford, NH; 3 pgs.

Papanikolopoulos, Nikolaos, CISE Research Resources: Teams of Miniature Mobile Robots, Award Abstract, Award No. 0224363 [online]. National Science Foundation, project dates Nov. 1, 2002 to Oct. 31, 2005 [retrieved on Feb. 18, 2004]. Retrieved from the Internet: <URL:https://www.fastlane.nsf.gov/servlet/showaward?award=0224363>; 3 pgs.

Papanikolopoulos, Nikolaos, ITR: Collaborative Research: Multi-Robot Emergency Response, Award Abstract, Award No. 0324864 [online]. National Science Foundation, project dates Sep. 15, 2003 to Aug. 31, 2007 [retrieved on Nov. 18, 2005]. Retrieved from the Internet: <URL:http://www.nsf.gov/awardsearch/showAward.do?AwardNumber=0324864>; 2 pgs.

Parker, "On the design of behavior-based multi-robot teams," *Advanced Robotics*, 1996; 10(6):547-578.

Pellerin, "Twenty-first Century Sentries," *Industrial Robot*, 1993; 20(2):15-17.

Porteous, "Intelligent Buildings and Their Effect on the Security Industry," *Proceedings of the Institute of Electrical and Electronics Engineers, 29th Annual, 1995 International Carnahan Conference on Security Technology*, Sanderstead, Surrey, England, Oct. 18-20, 1995; 186-188.

Pritchard et al., "Test and Evaluation of Panoramic Imaging Security Sensor for Force Protection and Facility Security," *Proceedings of the Institute of Electrical and Electronics Engineers, 32nd Annual, 1998*

*International Carnahan Conference on Security Technology*, Alexandria, VA, Oct. 12-14, 1998; 190-195.

Rybski et al., "Enlisting Rangers and Scouts for Reconnaissance and Surveillance," *IEEE Robotics & Automation Magazine*, 2000; 14-24.

Saitoh et al., "A Mobile Robot Testbed with Manipulator for Security Guard Application," *Proc. of the IEEE Int'l Conference on Robotics and Automation*, Nagoya, Japan, 1995; 3:2518-2523.

Schempf et al., "Pandora: Autonomous Urban Robotic Reconnaissance System," *1999 IEEE*, May 1999, Detroit, MI; 2315-2321.

Spofford et al., "Collaborative robotic team design and integration," To appear in *Unmanned Ground Vehicle Technology II*, SPIE Proceedings vol. 4024, Orlando Fl, Apr. 2000; 12 pgs.

Weisbin et al., "Miniature Robots for Space and Military Missions," *IEEE Robotics and Automation Magazine*, 1999; 6(3):9-18.

Yim et al., "Modular Robots," *Robotics, IEEE Spectrum*, 2002; 30-34.

\* cited by examiner

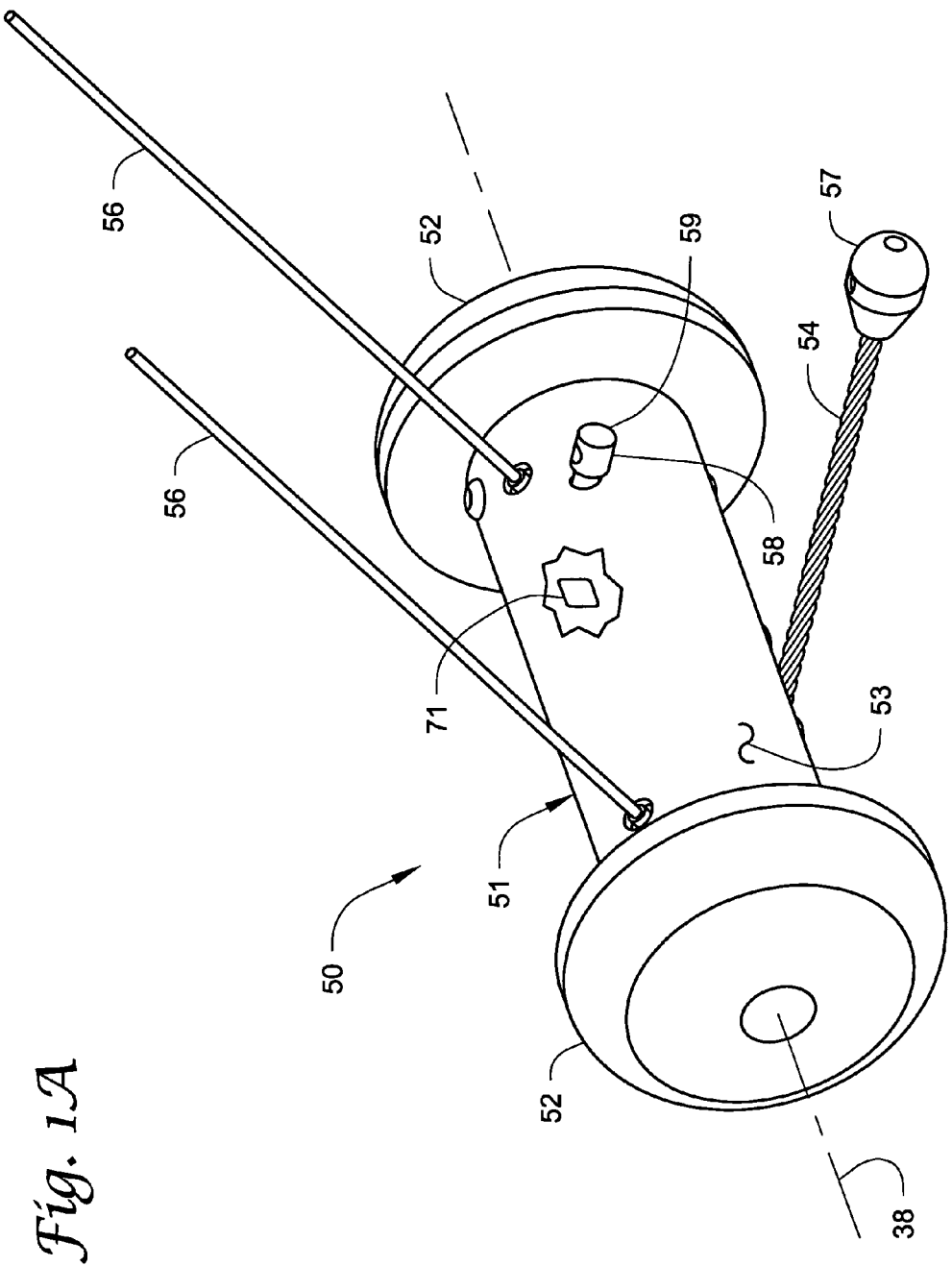

RUGGEDIZED ROBOTIC VEHICLES

RELATED APPLICATION(S)

This application claims the benefit of U.S. Provisional Application No. 60/552,010, filed 10 Mar. 2004, which is incorporated herein by reference in its entirety.

GOVERNMENT RIGHTS

The present invention was made with support from the National Science Foundation under Contract Nos. CNS-0224363 and CNS-0324864. The U.S. government may have certain rights in this invention.

TECHNICAL FIELD

The present invention relates generally to robotic vehicles, and, more particularly, to miniature rugged robotic vehicles suitable for a variety of tasks including, for example, covert surveillance and reconnaissance.

BACKGROUND

Reconnaissance and surveillance of potentially hazardous areas are of significant interest to civilian and government agencies alike. While by no means a complete list, hostage and survivor rescue missions, illicit drug raids, reconnaissance, and response to chemical or toxic waste spills are some of the operations that may benefit from a reconnaissance or surveillance component.

While various systems may satisfactorily provide this capability, one promising solution is provided by the use of one or more robotic vehicles. These robotic vehicles may travel into areas deemed unsafe or otherwise unfriendly to humans and relay information back to remote personnel/equipment. While the exact configurations of such vehicles may vary, they typically include at least a body to carry the vehicle's payload/operational components (e.g., communication equipment, power supply, etc.), as well as powered ground-engaging members (e.g., wheels) to propel the vehicle over terrain. Using one or more sensors associated with the body, these robotic vehicles may act as remote and mobile eyes, ears, nose, etc. of a reconnaissance/surveillance system.

While acceptable for many tasks, many conventional robotic systems are ill-suited for covert surveillance due to their relatively large size. That is, many reconnaissance/surveillance activities require covert action and/or movement within small spaces that may not be possible with conventional robotic vehicles.

Accordingly, robotic vehicles intended for covert operations are preferably relatively small. However, as is common with miniaturization, small robotic vehicles may sacrifice ruggedness and durability in order to achieve size and cost restrictions. As a result, such vehicles may be unable to operate under the harsh conditions sometimes accompanying reconnaissance and surveillance missions.

SUMMARY

The present invention may overcome drawbacks associated with conventional miniature robotic vehicles. For example, robotic vehicles in accordance with the present invention may be sufficiently small to operate clandestinely and within limited spaces as may be required during surveillance applications. Moreover, robotic vehicles in accordance with the present invention may include structural features that improve vehicle ruggedness and survivability.

In one embodiment, a robotic vehicle is provided having an elongate body defining a body axis. A tire is also provided and coupled to each end of the body, wherein a diameter of each tire tapers over a portion of an axial width of the tire. Also included is a tail member coupled to the body and extending outwardly therefrom.

In another embodiment, a robotic vehicle is provided including an elongate body defining a body axis, and a tire coupled to each end of the body. Each tire is rotatable about a wheel axis that is substantially coaxial with the body axis, wherein each tire has an inboard portion defined by a substantially uniform rolling diameter, and an outboard portion defined by a variable rolling diameter. Also included is an elongate tail member coupled to the body, wherein the tail member extends from the body at substantially a right angle.

In yet another embodiment, a robotic vehicle is provided having an elongate tubular body, and a wheel assembly coupled to ends of the body. Each wheel assembly includes a tire having an inboard portion characterized by a first stiffness and an outboard portion characterized by a second stiffness, wherein the first stiffness is greater than the second stiffness. A single-piece chassis extending substantially between the two wheel assemblies is also included, wherein the chassis is substantially enclosed by the tubular body.

In still yet another embodiment, a method for conducting remote reconnaissance/surveillance is provided. The method includes providing a robotic vehicle having an elongate body; a sensor coupled to the body; and a wheel assembly coupled to each end of the body. Each wheel assembly includes a tire having an inboard portion defined by a substantially uniform rolling diameter, and an outboard portion defined by a variable rolling diameter. The vehicle further includes a drive motor assembly powering each wheel assembly, and a tail member coupled to the body at a location between the wheel assemblies. The method further includes delivering the robotic vehicle to a surveillance site, collecting data from the surveillance site with the sensor, and transmitting the data to a remote computer.

The above summary is not intended to describe each embodiment or every implementation of the present invention. Rather, a more complete understanding of the invention will become apparent and appreciated by reference to the following Detailed Description of Exemplary Embodiments and claims in view of the accompanying figures of the drawing.

BRIEF DESCRIPTION OF THE VIEWS OF THE DRAWING

The present invention will be further described with reference to the figures of the drawing, wherein:

FIG. 1A is a rear perspective view of a robotic vehicle in accordance with one embodiment of the invention;

Figure 1B:
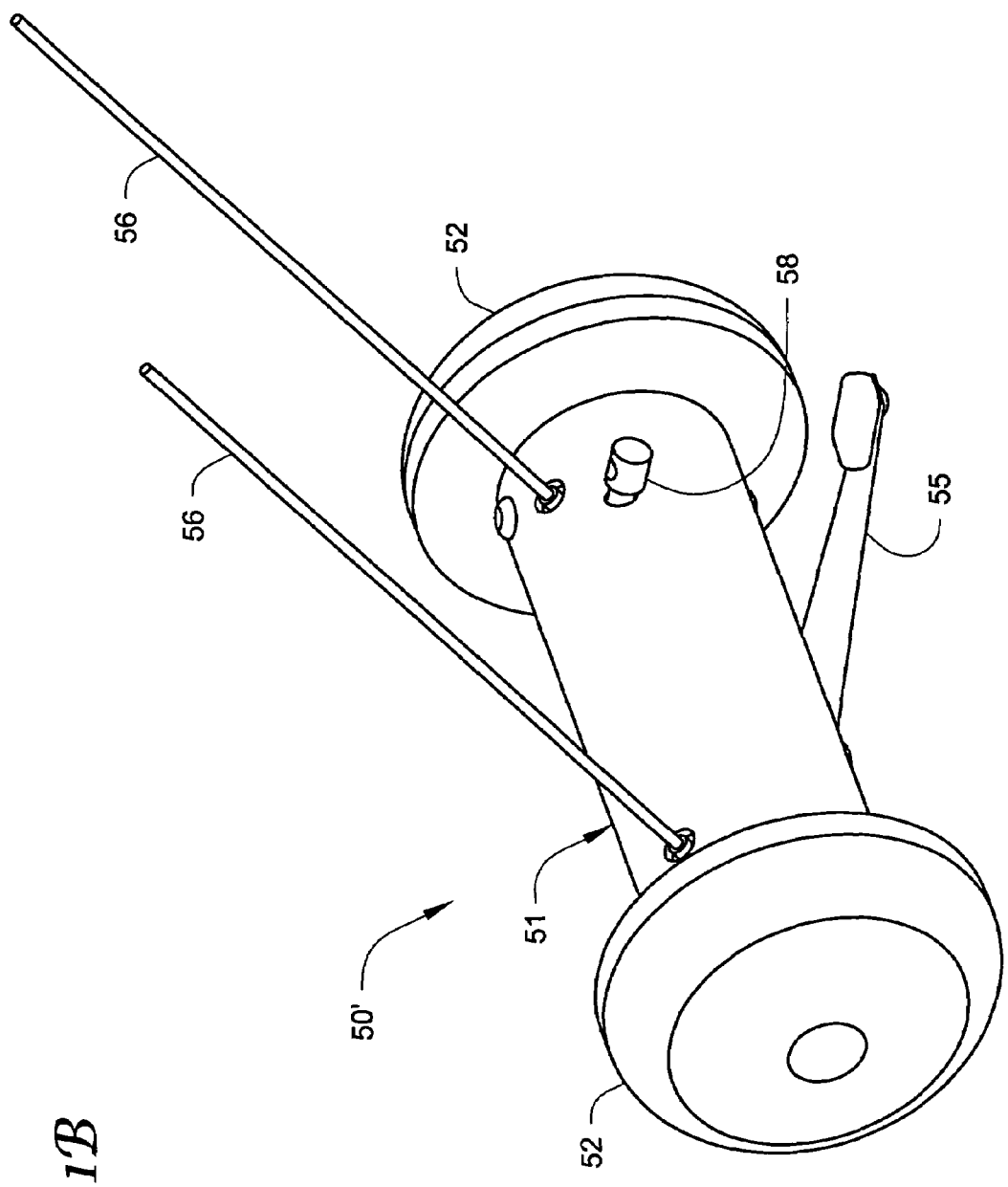
FIG. 1B is a rear perspective view of a robotic vehicle in accordance with another embodiment of the invention.

The figures are rendered herein primarily for clarity and, as a result, are not necessarily drawn to scale.

DETAILED DESCRIPTION OF EXEMPLARY EMBODIMENTS

In the following detailed description of illustrative embodiments of the invention, reference is made to the accompanying figures of the drawing which form a part hereof, and in which are shown, by way of illustration, specific embodiments in which the invention may be practiced. It is to be understood that other embodiments may be utilized and structural changes may be made without departing from the scope of the present invention.

Generally speaking, the present invention is directed to miniature robotic vehicles suitable for survival and reliable operation in harsh environments. Robotic vehicles in accordance with embodiments of the present invention may be suitable for a variety of tasks including, for example, clandestine reconnaissance and surveillance. The robotic vehicles described herein may include one or more on-board sensors, e.g., cameras, capable of transmitting information about the surveillance site to remotely located personnel.

The robotic vehicles described herein may be controlled by any number of techniques including, for example, autonomous or semi-autonomous control, remote control, or combinations thereof. In some embodiments, the robotic vehicle is controlled by an operator via a remote computer, e.g., handheld communications device. Data collected by the robotic vehicle's sensors may be transmitted to the remote computer to provide real-time feedback.

The term "remote computer" is used herein to indicate most any device that is capable of remotely communicating with (e.g., transmitting data to and/or receiving data from) the robotic vehicle. Such computers may include, for example, handheld or body-supported (wearable) computers, laptop computers, and workstations. Moreover, most any communication protocol is contemplated including, for example, short-range radio frequency, satellite, cellular, and wireless local area network (WLAN such as IEEE 802.11x protocols). Preferably, robotic vehicles in accordance with embodiments of the present invention incorporate rugged components, e.g., chassis, drive train, sensors, etc. As a result, the vehicle may survive under harsh operating conditions such as those experienced during landing (e.g., from tossing, dropping).

Robotic vehicles in accordance with the present invention may be similar to, or include features and components of, the robotic vehicles described in: U.S. Pat. No. 6,548,982 (Papanikolopoulos et al., issued 15 Apr. 2003); U.S. Pat. Publication No. 2003/0137268 A1 (Papanikolopoulos et al., published 24 Jul. 2003); and U.S. Pat. Publication No. 2004/0000439 A1 (Burt et al., published 1 Jan. 2004). Robotic vehicles in accordance with embodiments of the present invention may also include features described in Increasing *The Scout's Effectiveness Through Local Sensing and Ruggedization*, Drenner et al. (Proceedings of the 2004 IEEE International Conference on Robotics and Automation (New Orleans, La., April 2004)).

FIG. 1A illustrates a robotic vehicle 50 in accordance with one embodiment of the present invention. The vehicle 50 may include an elongate body or body portion 51 supported for rolling engagement with a ground surface by one or more, e.g., two, wheel assemblies 52. The body 51 may form a tubular shell 53, which, in one embodiment, is made of a titanium alloy. Alternatively, the shell could be constructed of semi-cylindrical panels that attach to an internal chassis (further described below). While not limited to any particular size, the robotic vehicle may, in one embodiment, have a length of about 100 millimeters (mm), excluding the wheel assemblies, with the body 51 having a major cross-sectional dimension (e.g., diameter) of about 38 millimeters or less, e.g., about 35 mm. However, other sizes are certainly possible without departing from the scope of the invention. Moreover, while the body 51 is illustrated as having a circular cross-section, other shapes (e.g., rectangular cross-section) are certainly possible without departing from the scope of the invention.

The two wheel assemblies 52, which may each include a tire, may be located at opposite ends of the body 51. In the illustrated embodiments, the wheel assemblies 52 (e.g., tires) rotate about an axis that is parallel to, e.g., coaxial with, an axis 38 of the body 51.

Figure 10:
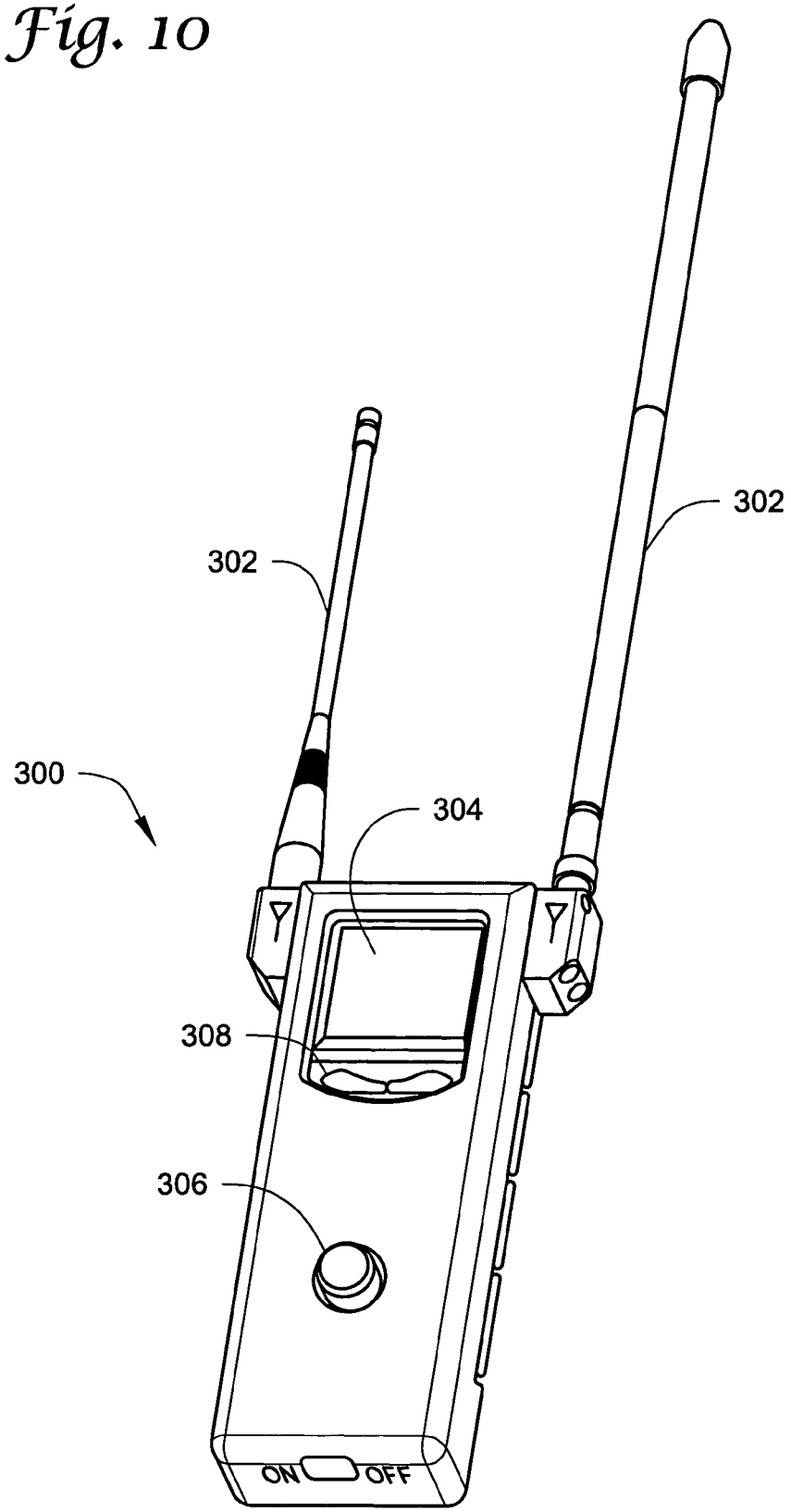
FIG. 10 is a perspective view of an exemplary remote computer for communicating with robotic vehicles in accordance with the present invention.

One or more antennae 56, electrically coupled to communication circuitry (diagrammatically represented as reference numeral 71 in FIG. 1A), may also be provided to permit communication with the remote computer (see, e.g., remote computer 300 shown in FIG. 10). A switch assembly 58, as further described below, may also be included to selectively activate and deactivate electrical circuits within the vehicle 50.

A supporting tail member, e.g., tail 54, may couple to the body 51 at a location between the two wheel assemblies 52. The tail 54 may, in the embodiment illustrated in FIG. 1A, extend outwardly from the body 51 at substantially a right angle (e.g., the tail may define an axis that, when projected normally to a plane containing the body axis, intersects the latter at about 90 degrees). The tail 54 may be a stainless steel wire rope having a diameter of about 3 millimeters (mm) (about ⅛ inch). Fasteners 65 and/or clamps 67 (see FIG. 1D) may be used to secure the tail 54 to the body portion 51. During operation of the vehicle 50, a distal end of the tail 54 may drag along the ground surface to stabilize the vehicle in the desired angular orientation.

In one embodiment, the tail 54 includes a collar 57 secured to its distal end with a set screw or the like. The collar 57 may serve multiple purposes including, for example, preventing unraveling of the strands that make up the wire rope, protecting operators from the sharp ends of the strands, and reducing catching of the tail on ground objects.

FIG. 1B illustrates a vehicle 50' substantially identical to the vehicle 50 of FIG. 1A, with the exception that the tail 54 has been replaced with tail 55. The tail 55 may, in one embodiment, be made from sheet stock, e.g., sheet metal or the like. That tail 55 provides potentially greater stiffness than the wire rope of tail 54. The rigidity of the tail 55 may be varied by changing the design configuration (e.g., changing the thickness, width, or other aspects of the sheet material). The tail 55, as with the tail 54, may be secured to the body portion 51 with a clamp (not shown) or similar mechanism as is known in the art.

The choice of tail configurations may be selected based upon the intended vehicle mission. For example, the wire rope tail 54 may be beneficial in applications where compliance in most all directions is advantageous. For example, where the vehicle may be delivered by throwing or dropping from substantial distances, the compliant characteristics of the tail 54 may result in little or no damage to the tail or its mounting hardware from landing impact. However, other applications may benefit from the more rigid characteristics of the sheet metal tail 55.

Figure 1C:
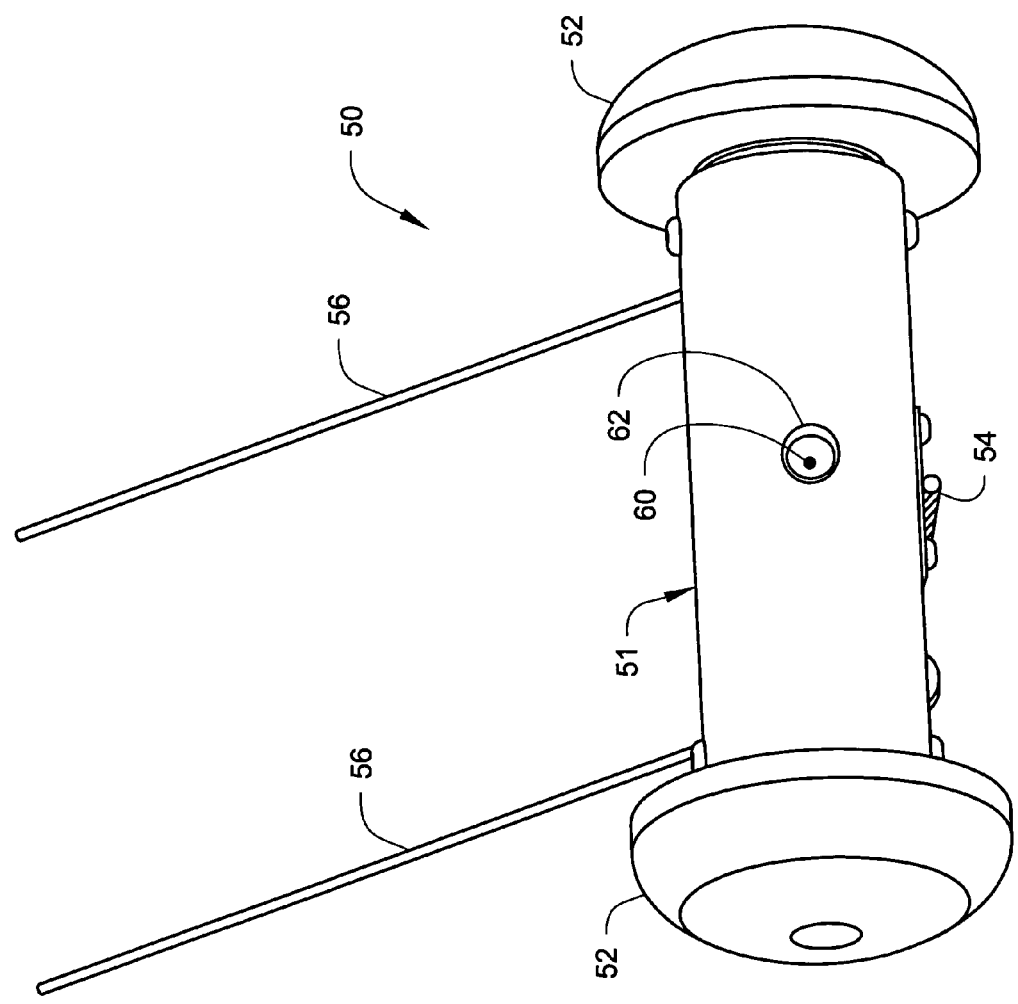
FIG. 1C is a front perspective view of the robotic vehicle of FIG. 1A.
Figure 1D:
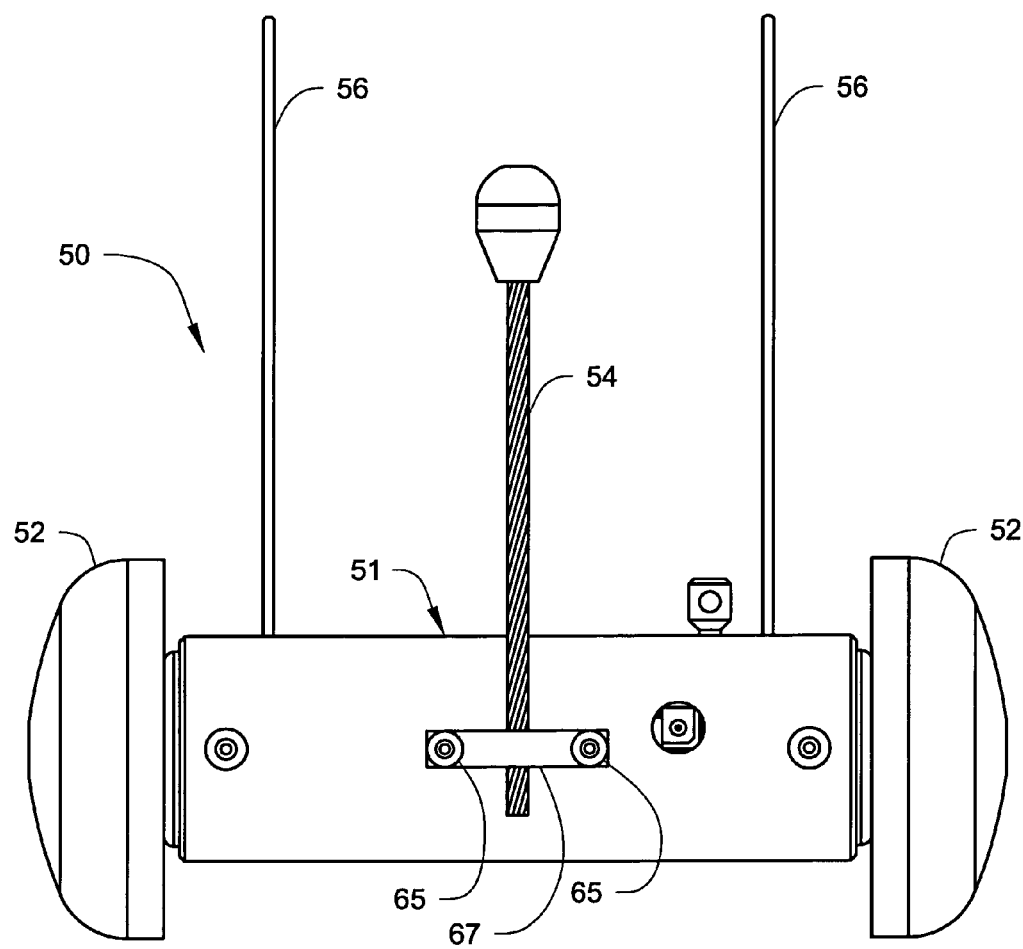
FIG. 1D is a lower elevation view of the robotic vehicle of FIG. 1A.

FIG. 1C is a front elevation view of the vehicle 50. As illustrated in this view, the vehicle 50 may include a sensor, e.g., video camera 60, that mounts within the body 51 as further described below. The body 51 may define an opening 62 through which the camera lens may operate. The opening 62 may be covered e.g., with a transparent lens cover, to protect the camera during vehicle use. The camera 60, opening 62, and the configuration of the tail 54 are preferably selected to ensure that the camera is positioned to have the desired field of view during normal vehicle operation.

While a single camera 60 is illustrated, other vehicles may incorporate most any number of cameras or alternative sensors without departing from the scope of the invention. Exemplary sensors may include: video and/or still cameras; pyroelectric sensors for detecting thermal presence; photovoltaic sensors (light intensity sensors); infrared sensors (e.g., infrared rangefinders); proximity sensors; radiation/hazardous gas sensors; etc. Some of these sensors, e.g., the light intensity sensors, may assist the vehicle in seeking dark areas autonomously to avoid detection once deployed. This process is described in more detail in Drenner et al. The camera and other sensors, in one embodiment, may collect and then transmit data to the remote computer via a 900 MHz transmitter made by Applied Wireless, Inc. of Camarillo, Calif., USA, under model no. T900V. In another embodiment, separate transmitters may be used for video (e.g., 434 Mhz), and commands (e.g., 75 Mhz). In one embodiment, the video transmitter may be a model AVX434MINI sold by Supercircuits, Inc. of Liberty Hill, Tex., USA.

With this general description, attention is now directed to various structural and mechanical features and systems of robotic vehicles in accordance with the present invention. It is noted that the embodiments described below are merely illustrative of the invention. Thus, variations and modifications are certainly possible without departing from the scope of the invention.

FIGS. 2-5 illustrate various views of an exemplary chassis 100 for use with the robotic vehicle 50 (and 50') described above. The chassis 100 may form an internal framework for the body 51 and, in the illustrated embodiments, may span substantially entirely between the wheel assemblies 52.

Figure 2:
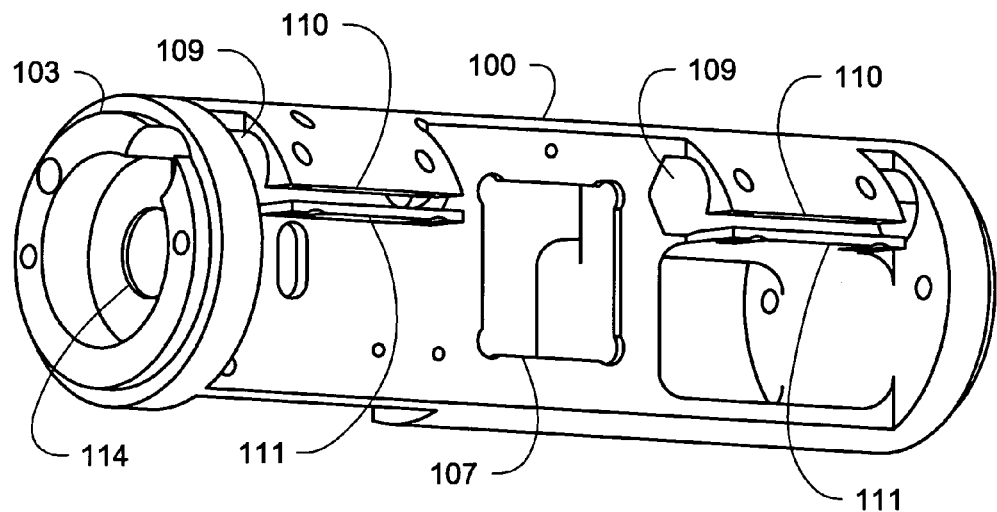
FIG. 2 is a front perspective view of an exemplary chassis for use with any of the vehicles of FIGS. 1A-1D.
Figure 3:
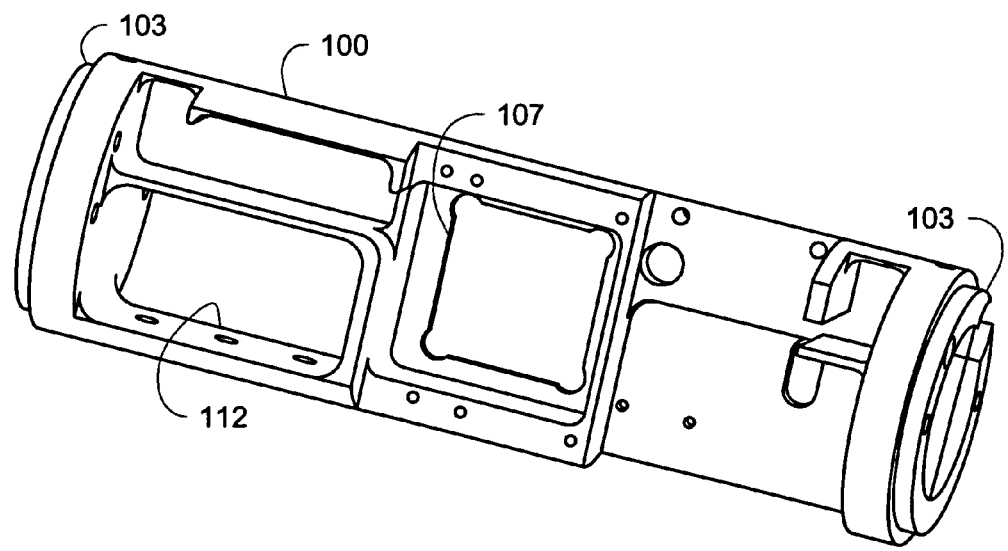
FIG. 3 is a rear perspective view of the chassis of FIG. 2.

The chassis 100 may be made from a single billet of material as shown in FIG. 2 to yield a relatively rigid structure that requires a minimal number of fasteners and interconnection points as compared to a multi-component chassis. In one embodiment, the chassis 100 is machined from a single block of 7075 aluminum or Fortal brand high strength aluminum. However, other materials (e.g., magnesium alloy) and processes (e.g., a sintered metal processes, welding) could also be used to obtain the desired shape.

In still other embodiments, the single-piece chassis 100 could be made from materials such as plastic, e.g., a fiber-reinforced plastic. An injection molding or a polymer matrix process could be used to fabricate the chassis from plastic or plastic composites. A similar material could also be used to form the outer tubular shell 53 (see FIG. 1A) that covers the chassis 100. By utilizing such plastic materials, fasteners and other components such as switches, electronics, and antennae mounts, could potentially be integrated into the chassis structure during manufacture.

Figure 4:
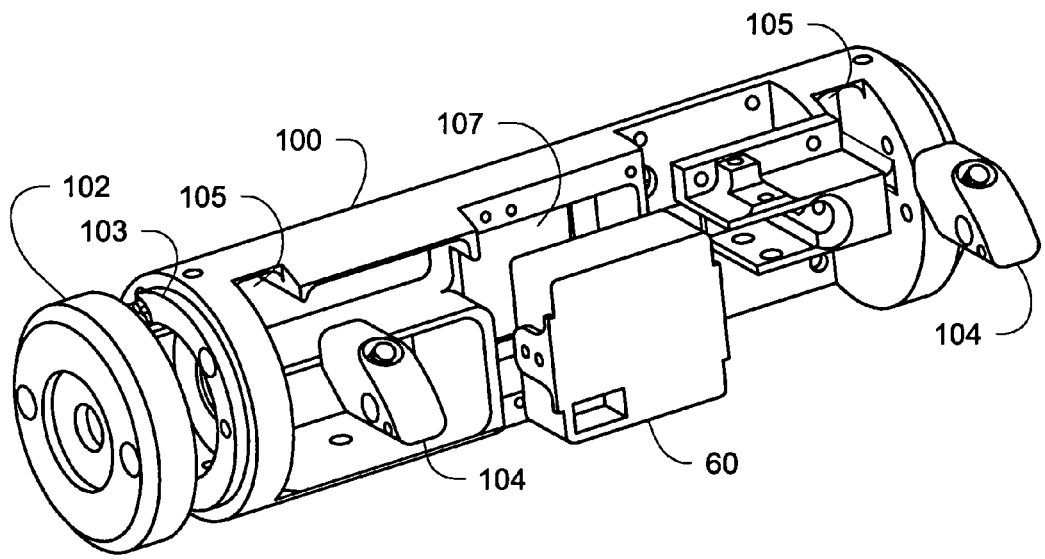
FIG. 4 is a rear perspective view of the chassis of FIG. 2 illustrating the attachment of various components.
Figure 5:
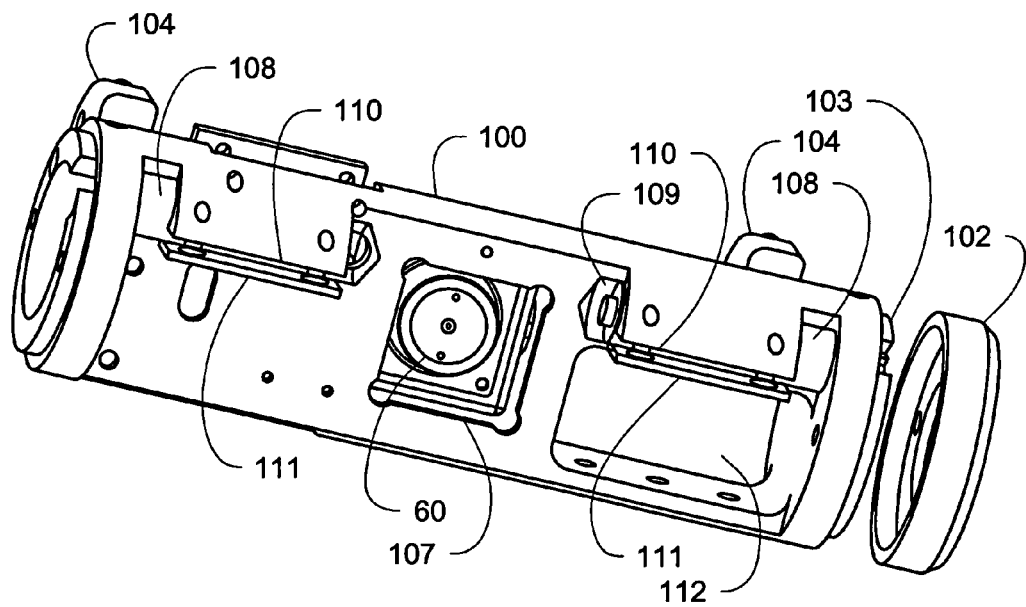
FIG. 5 a front perspective view of the chassis and components of FIG. 4.

FIGS. 4 and 5 illustrate the chassis 100 with various optional components attached thereto. In the illustrated embodiments, many components may be attached to the frame and secured, to a large degree, by capture or pocketing within openings formed in the chassis 100. For example, antenna mounting blocks 104 (see FIG. 4) may be captured within receiving pockets 105 formed in the chassis 100. As a result of the capture provided by the pockets 105, the blocks 104 may each hold a respective antenna 56 in place with the use of a single fastener, e.g., bolt (not shown). The pocketing of the blocks 104 within the chassis 100 may further allow a substantially rigid interconnection between the blocks and chassis, improving the overall ruggedness of the robotic vehicle 50.

Similar pocketing of other components such as the sensor, e.g., camera 60 (in receiving pocket 107), and electrical drive motor assemblies 108 (in receiving pockets 109) may be provided as shown. The pockets 109 may be formed by clamp mounts having first and second ears 110, 111 that are integrally formed with the chassis 100 as shown in FIGS. 2 and 5. Fasteners (not shown) may be used to draw the ears 110, 111 together and clamp the motor assemblies 108 within the respective pockets 109. Such attachment provides not only secure mounting of the motors assemblies, but also beneficial heat transfer and RF noise shielding. The motor assembly 108 may, in one embodiment, be a model 0816008S with a series 08/1 64:1 planetary gearhead manufactured by MicroMo Electronics, Inc. of Clearwater, Fla., USA.

Other chassis pockets, e.g. pocket 112, may also be provided to accommodate other on-board equipment (not shown) such as batteries, other sensors, and control/communication electronics. While various power sources are contemplated, lithium polymer batteries may be advantageous due to their high energy density.

An endcap 102 (only one shown in FIGS. 4 and 5), as clearly shown in FIGS. 4 and 5, may fit over a lip 103 formed on each end of the chassis 100 and assist in retaining components (not shown) attached to the chassis ends.

The chassis 100 may be configured to accommodate modular, off-the-shelf components. For example, in one embodiment, the camera 60 is a model KPC-S20P3 manufactured by Korea Technology and Communications (KT&C) of Gyungki-Do, Korea. In alternative embodiments, other sensors, such as the model 442-3 IR-EYE pyroelectric sensor manufactured by ELTEC Instruments, Inc. of Daytona Beach, Fla., USA may be included in place of, or in addition to, the camera 60.

The chassis 100 may give the vehicle desirable inertial load capability, as well as acceptable torsional and axial stiffness, without adding excessive weight. As a result, the vehicle may be delivered (e.g., thrown or dropped) from substantial distances without incurring fatal structural failure.

Figure 6:
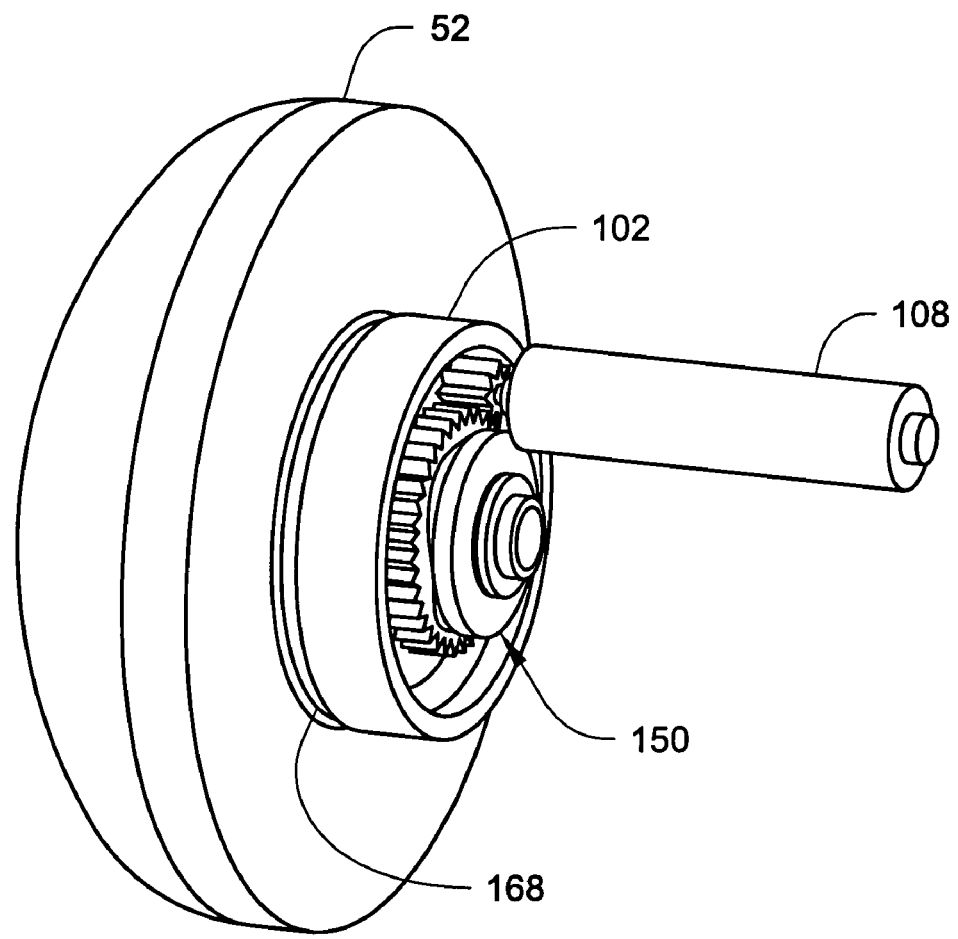
FIG. 6 is a perspective view of an exemplary wheel assembly and associated clutch assembly for use with any of the vehicles of FIGS. 1A-1D.

Another system that may improve the survivability of the vehicle 50 is the wheel assembly 52 and its associated drive train, an exemplary embodiment of which is illustrated in FIG. 6 (note: the chassis 100 and remaining body portion 41 are removed from this figure for clarity).

When the vehicle 50 is thrown or dropped into a designated target area, the wheel assemblies 52 often bear the brunt of the impact. As a result of such harsh impact, a substantial torque load may be transferred from the wheel assembly 52 back through the vehicle's drive train. Accordingly, a clutch assembly 150 may be provided to dissipate this load and avoid or reduce damage to drive train components.

Figure 7A:
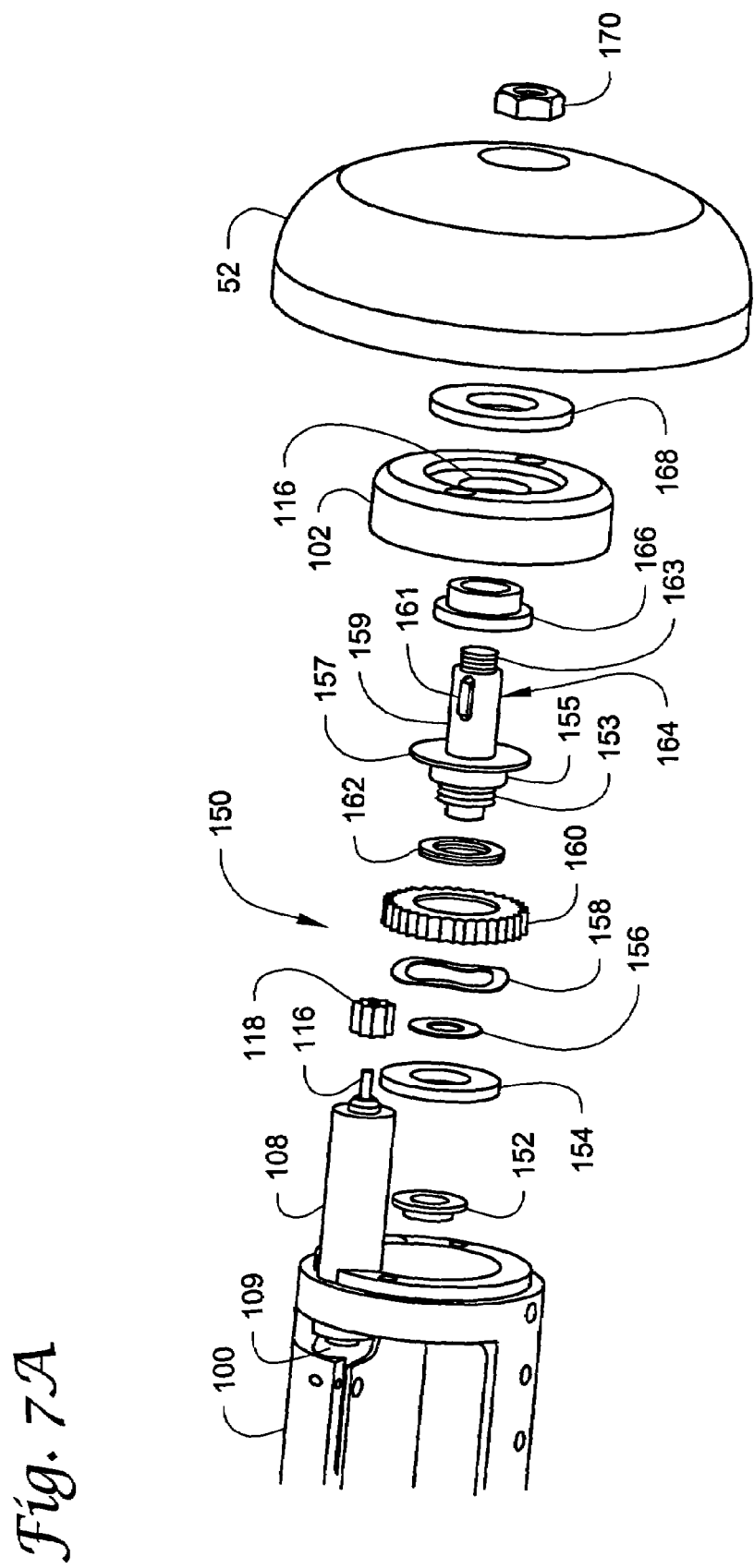
FIG. 7A is an exploded perspective view of the wheel and clutch assemblies of FIG. 6.

FIG. 7A is an exploded view of the exemplary clutch assembly 150 of FIG. 6 with the wheel assembly 52 and chassis 100 shown for reference. Although only one side is illustrated in this view, it is understood that the opposite side of the vehicle 100 may include a substantially identical clutch assembly to power the opposite wheel assembly.

The electric drive motor assembly 108 is illustrated partially inserted into the pocket 109 of the chassis 100 (the drive motor assembly may be secured within the pocket 109 as already described above). Although not illustrated in the figures, the drive motor assembly 108 may include, in addition to an electric motor, a gear reduction transmission system operable to control the resultant output speed of a motor pinion shaft 116 and its attached pinion gear 118.

The clutch assembly 150 may include an inner flange bearing 152 operable to seat within an opening 114 formed in each end of the chassis (see FIG. 2). The inner flange bearing 152 may provide a bearing surface for engaging a retaining washer 154 positioned immediately adjacent the bearing 152.

The retaining washer 154 may include a threaded inner diameter operable to receive and capture a threaded end 153 of an axle 164. The axle 164 may include a first shoulder 155 for receiving both a driven gear 160 and one or more spacing washers 162. The driven gear 160 preferably sits with clearance on the first shoulder 155 so that the driven gear may rotate relative to the axle 164. The axle may further include a flange 157 operable to control the axial position of the driven gear 160 on the axle 164.

A biasing member, e.g., wave spring washer 158, and one or more additional spacing washers 156 may be provided between the driven gear 160 and the retaining washer 154. The spacing washer 156 may have an outer diameter that is smaller than an inner diameter of the spring washer 158. The spacing washers 156 and 162, in conjunction with the spring washer 158, allow controlled application of an axial clamping force to the gear 160 against the flange 157. That is, by adjusting the thickness of the spacing washer stacks, the frictional engagement between the driven gear 160 and the axle 164 may be controlled.

While illustrated herein as providing an adjustable axial clamping force to the gear, other clutch assembly embodiments may remove such variability and control component tolerances to achieve a particular friction fit. In such cases, the spacing washers could be optional and the retaining washer 154 could be replaced with a fixed-location member such as a snap ring.

The axle 164 may further include an opposing second or outer shoulder 159 operable to receive an outer flange bearing 166 with slight clearance. The second shoulder 159 may include a keyway and removable key 161 for engaging the wheel assembly as further described below.

When the outer flange bearing 166 is positioned on the axle 164, the assembled axle (i.e., with the gear 160, spring washer 158, spacer washer 156, and retaining washer 154 secured thereto) may be positioned such that a protruding inner end of the axle engages the inner flange bearing 152. The axial location of the drive motor assembly 108 may then be adjusted to ensure that the pinion gear 118 is aligned with the driven gear 160. The endcap 102 may then be placed over the second shoulder 159 of the axle 164 such that the shoulder and the outer flange bearing 166 protrude outwardly through a central opening 116 of the endcap 102 (the flange portion of the bearing 166 may be retained by the inner face of the endcap). The endcap 102 may then be attached to the end of the chassis 100, e.g., with fasteners (not shown). The attachment of the endcap 102 may secure the clutch assembly 150 in place relative to the chassis 100.

external thrust bearing 168 may be positioned within a recess formed in the endcap 102 such that the protruding portion of the axle 164 extends therethrough. The external thrust bearing 168 may be slightly thicker than the recess in the endcap 102 such that the bearing protrudes beyond the outer face of the endcap.

Figure 8A:
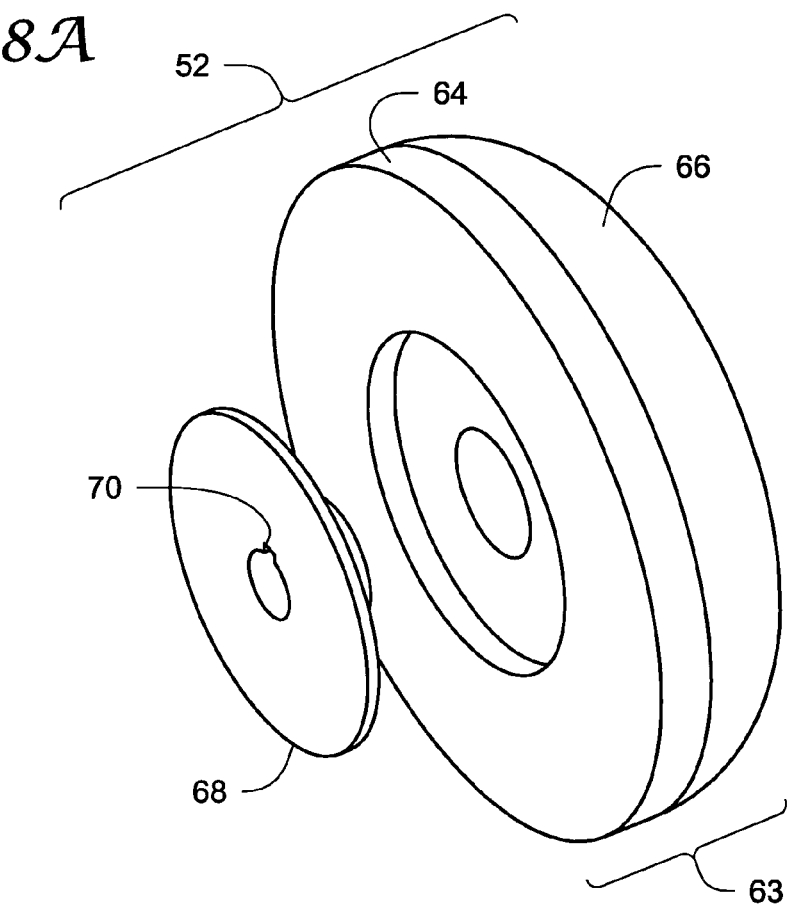
FIG. 8A is a partial exploded view of the wheel assembly of FIG. 7A.

At this point, the key 161 may be placed within the axle keyway and the wheel assembly 52 installed such that the key enters a corresponding keyway within a hub of the wheel (see FIG. 8A). A fastener, e.g., nut 170, may then couple to a threaded end 163 of the axle 164 to retain the wheel assembly in place.

During operation, the clutch assembly 150 may allow transmission of power from the drive motor assembly 108 to the wheel assembly 52 (via the driven gear 160) due to frictional engagement between the driven gear and the axle 164. However, when the torque between the axle 164 and the gear 160 reaches or exceeds a predetermined or threshold torque value, the gear 160 may "slip" (rotate) relative to the axle 164. Such slippage may prevent, or substantially reduce, potential damage to sensitive drive train components (e.g., to the pinion gear 118 and motor assembly 108).

Such a threshold torque may be encountered when the robotic vehicle 50 strikes the ground upon delivery. For example, if the vehicle 50 is thrown by an operator into a surveillance area, the impact of the vehicle's landing may impart a substantial torque to one or both wheel assemblies 52. Without the presence of a clutch assembly as described herein, this torque may be transmitted through the entire drive system, e.g., through the pinion gear 118/driven gear 160 interface and the gear reduction system located within the drive motor assembly 108. Such torque loads may damage or even destroy some of these drive train components. To further enhance vehicle survivability, the pinion gear 118 and the driven gear 160 could, in some embodiments, be made from a hardened material, e.g., 4130 steel or similar material.

As described above, the threshold torque value at which the driven gear 160 may begin slipping may correspond to the frictional clamp load applied between the retaining washer 154 and the flange 157 of the axle 164. In one embodiment, the clutch assembly 150 is set to slip at a predetermined threshold torque of about 0.15 Newton-meters.

Figure 7B:
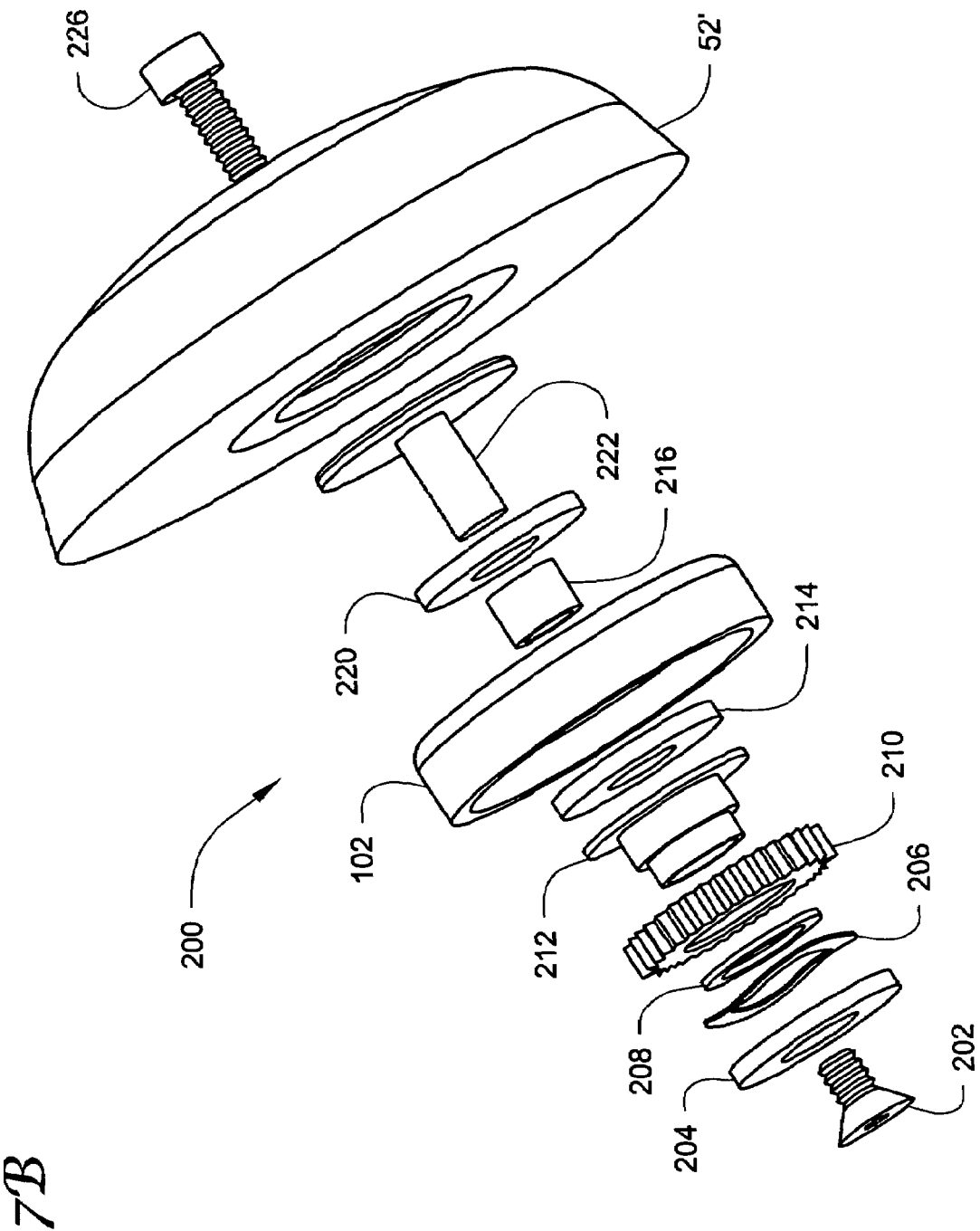
FIG. 7B is an exploded view of a clutch assembly in accordance with another embodiment of the invention.

FIG. 7B illustrates an exploded view of a clutch assembly 200 in accordance with an alternative embodiment of the invention. The clutch assembly 200 is similar in construction and functionality to the clutch assembly 150 described above. The components of the exemplary clutch assembly 200 from left to right in FIG. 7B include: a fastener 202; a retaining washer 204; a biasing member (e.g., a spring washer 206); clutch tension washers 208; a driven gear 210; a clutch bell 212; a thrust washer 214; the endcap 102; a shaft bearing 216 for axle 222; another thrust washer 220; the axle 222; and a fastener 226 for securing a wheel assembly 52' to the axle.

As with the gear 160 in assembly 150, the gear 210 may freely rotate on the clutch bell 212, although it is restrained from axial motion. The spring washer 206 may apply an axial force against the gear 210 (between the retaining washer 204 and the flange of the clutch bell 212).

The retaining washer 204 may be stopped against the clutch tension washers 208. Once again, the thickness of the clutch tension washers 208 may control the compression of the spring washer 206, thereby setting the magnitude of the spring force and, accordingly, the threshold torque required to overcome the friction of the clutch assembly. The clutch tension washers 208 may be of a diameter that keeps the spring washer 206 generally centered (i.e., the outer diameter of the tension washers 208 may be about the same size as the inner diameter of the spring washer 206). Proper spacing of clutch assembly components may be accomplished, if necessary, with shims located between the various pieces. Thus, manufacturing tolerances may be relaxed without adversely impacting functionality.

The washer 204, spring washer 206, tension washer 208, and gear 210 may be positioned with the clutch bell 212 and the thrust washer 214, endcap 102, shaft bearing 216, washer 220, and axle 222 may be positioned as shown in FIG. 7B. The fastener 202 may then be inserted into the assembly and threaded into the axle 222. The endcap 102 may then be attached to the chassis with fasteners (not shown). The wheel 52' may then be placed against the axle 222 and the fastener 226 inserted through the wheel and threaded into the axle. An optional clamp washer may be located on the outside of the wheel to ensure effective clamping of the wheel with the fastener 226. As a result, the gear 210 may transmit power to the clutch bell 212 and, ultimately, the wheel assembly 52'. However, an impact load that results in transmission of a torque load in excess of the threshold torque value may result in slippage of the gear 210 relative to the clutch bell 212, thereby minimizing exposure of susceptible drive train components (e.g., pinion gear 118 and drive motor assembly 108 of FIG. 7A) to damaging loads.

Alternative clutch assemblies are also possible. For example, torque could be transferred by axially oriented parallel plates that may be subject to an axial force applied by spring washers. One or more of the plates could be rotationally fixed to the gear 210 and one or more other plates could be fixed to the clutch bell 212. Fixing could be accomplished in any number of ways including, for example, by keyway or splines. Accordingly, one or more plates would be captivated rotationally from the inside (clutch bell 212) and one or more other plates would be captivated rotationally from the outside (gear 210).

Regardless of the particular embodiment utilized, clutch assemblies in accordance with embodiments of the present invention may reduce or eliminate potential drive train damage due to impact loads experienced during operation, e.g., during vehicle delivery.

Figure 8B:
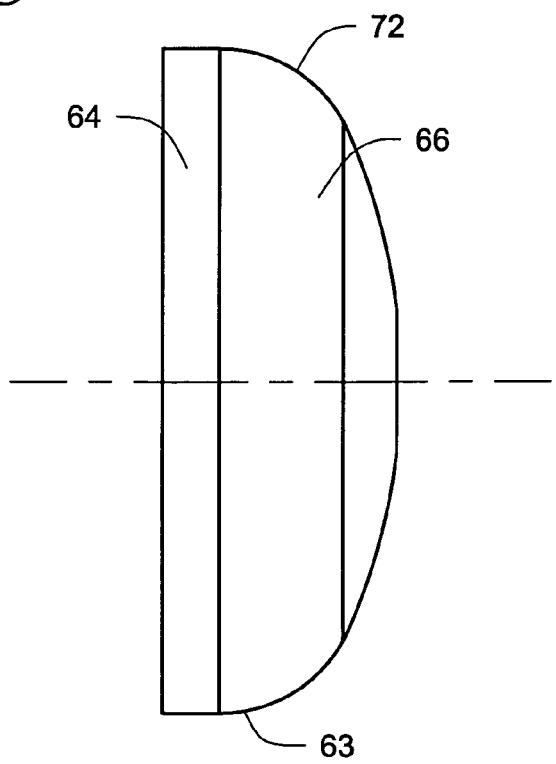
FIG. 8B is a front elevation view of a tire for use with the wheel assembly of FIG. 8A.

Like the chassis 100 and clutch assemblies described above, the wheel assemblies 52 (or 52') of the robotic vehicle 50 (see FIG. 1) may also be configured to improve survivability. For example, FIGS. 8A and 8B illustrate an exploded view of the wheel assembly 52 and a side elevation view of the same, respectively. Each wheel assembly 52, as further explained below, may be designed to cushion the robotic vehicle 100 upon landing.

In one embodiment, each wheel assembly may include one or more disks, e.g., hubs 68, imbedded in a tire 63 that has a tapered cross section, e.g., the outer diameter of the tire 63 may taper over a portion of its axial width such that it has a smaller diameter near an outboard region than it does near an inboard region. In the illustrated embodiment, the taper is created by a half-dome shaped portion of the wheel 63 (see FIG. 8B).

The hub 68 may permit mounting of the wheel assembly 52 to the clutch assembly 150 (e.g., to the axle 164 (see FIG. 7A)) and may further prevent excessive deformation of the wheel assembly in an axial direction.

The tapered (e.g., dome) shape of the tire 63 may protect the ends of the robotic vehicle during impact and assist in righting the vehicle upon landing (e.g., reduce the chance that the vehicle could come to a stop in an "end-up" position). The tapered outer diameter of each tire 63 may further reduce catching of the outermost edge of the tires on ground objects during operation.

To provide the desired cushioning, each tire 63 may be made from two different materials. A first or inboard portion 64 may include a first polyurethane material having a relatively high stiffness, e.g., a durometer of about 70 Shore A. The first portion 64 may be substantially cylindrical in shape such that it provides a generally uniform rolling diameter. Preferably, the uniform rolling diameter is larger than the major cross sectional dimension (diameter) of the body 51 to provide the vehicle with adequate ground clearance. Additionally, the larger tire may be of sufficient diameter to provide a sufficient range of tire deflection (e.g., due to anticipated landing impact loads) before the vehicle body would contact the ground surface. A second or outboard portion 66 of the tire 63 may include a second polyurethane material having a stiffness less than the stiffness of the first material, e.g., a durometer of about 30 Shore A. The second material may, in one embodiment, be co-molded with the first material in a two-shot mold process.

In one embodiment, the second portion of the tire is defined by an uneven or variable rolling diameter. The tapered (e.g., dome) shape of the tire 63 may be formed by an arc or curve 72 that defines a surface of revolution about the wheel axis (see FIG. 8B). However, other tapered shapes are certainly possible without departing from the scope of the invention. For example, most any tire configuration that provides the outboard portion with a diameter less than a diameter of the inboard portion (e.g., a frustoconically shaped tire) may be used. In still yet other embodiments, the taper may be optional, e.g., the wheel may have a generally uniform diameter across its entire width.

The polyurethane materials that form the tire 63 may be bonded directly to the hub 68. Although not illustrated, the hub 68 may be made from a relatively light yet stiff material, e.g., aluminum, and could include features, e.g., protrusions, abraded surfaces, etc. (not shown), that may augment the bond between the hub and the tire. As illustrated in FIG. 8A, the hub may further include a keyway 70 to receive the key 161 illustrated in FIG. 7A.

Preferably, the tire 63 is configured such that it may elastically deform to effectively dissipate kinetic energy (impact shock loads) over substantially any angle of impact of the vehicle 50 on a landing surface. Stated another way, the tire 63 can deform significantly in both radial and axial directions to dissipate impact loads resulting from most any angle of incidence of the vehicle on the landing surface. Anticipated maximum impact loads are preferably dissipated in the tire 63 without resulting in any permanent deformation of either the tire or the hub 68.

To achieve the desired shock absorption characteristics, the shape and relative hardness of each portion 64 and 66 of the tire 63 may be selectively controlled. For example, the tire may be progressively harder to compress such that impact loads are effectively absorbed by the tire 63 without generating substantial rebound energy. In other embodiments, the tire 63 could be produced from a single material, but include pockets or cutouts to weaken certain areas of the tire to provide for greater deflection. Alternatively, the tire 63 could include captive air pockets to achieve the desired deflection characteristics. In general, any tire configuration that provides effective cushioning to the vehicle by maintaining a deformable portion of the tire between the impact surface and the vehicle would be acceptable. While other shapes are possible, the shape of the tire in the illustrated embodiments (see, e.g., FIG. 8B) is desirable because it provides an axial outboard edge or face (defined by the arc or curve 72) capable of deforming and dissipating impact loads applied at the end of the vehicle 50.

Accordingly, the wheel assemblies 52, like the chassis 100, may contribute to the survivability of the vehicle 50. In particular, the wheel assemblies may attenuate impact loads that could otherwise damage the chassis and/or the vehicle's onboard components.

Figure 9A:
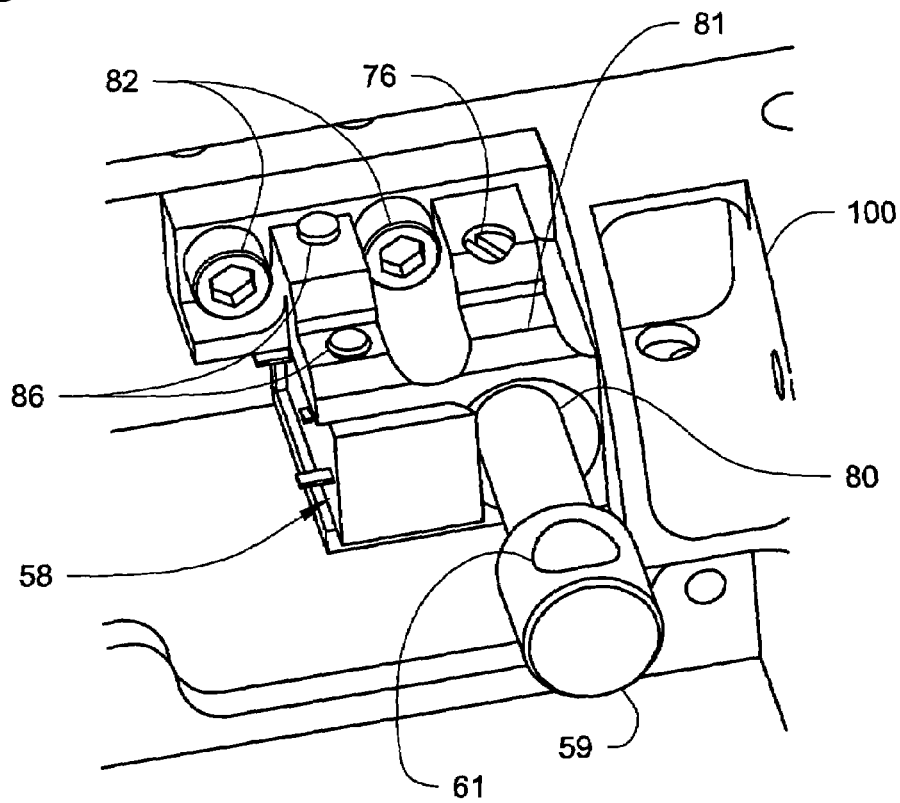
FIG. 9A is an enlarged perspective view of a switch assembly in accordance with one embodiment of the invention.
Figure 9B:
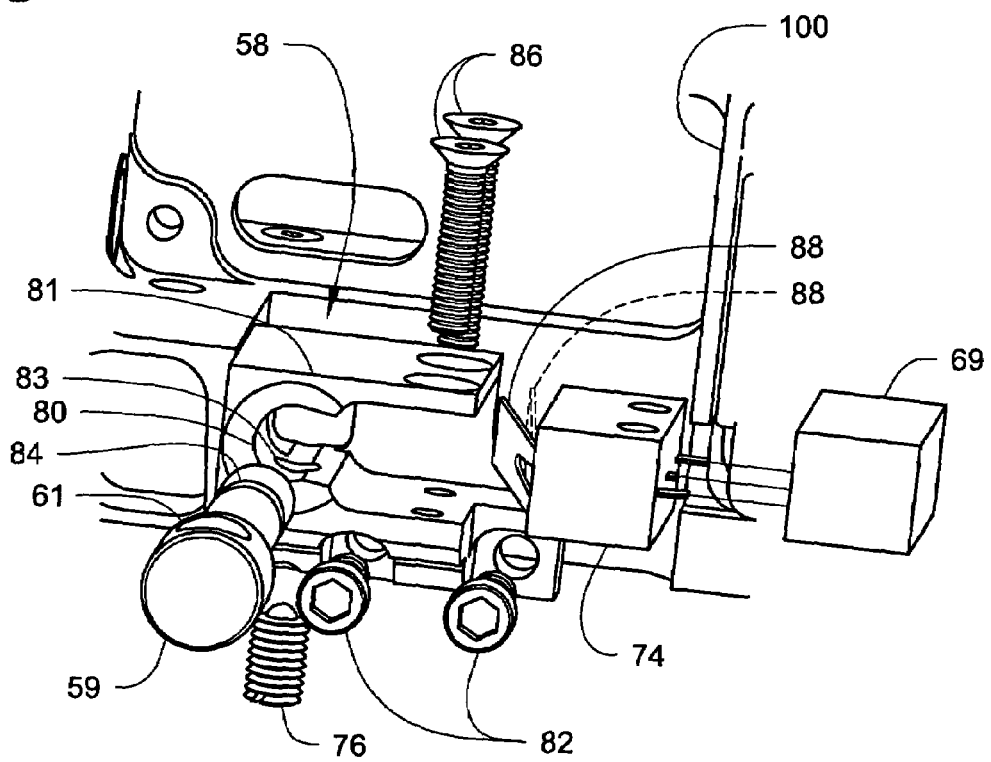
FIG. 9B is a partially exploded view of the switch assembly of FIG. 9A.

FIGS. 9A and 9B illustrate an assembled and a partially exploded view, respectively, of the switch assembly 58 of FIGS. 1A and 1B. In these views, the robotic vehicle is illustrated with some structure (e.g., tube 53) removed for clarity. The vehicle 50 may include the optional switch assembly 58 to permit decoupling of power to circuits 69 of the vehicle to prevent battery drain. When activated (e.g., immediately prior to delivery of the vehicle to a surveillance site), the switch assembly 58 may be manipulated to close these electrical circuits 69 so that operation of the vehicle 50 is permitted.

In the illustrated embodiments, the switch assembly 58 may include a housing 81 attachable to the chassis of the vehicle 50, e.g., with fasteners 82. The pin 59 (also shown in FIGS. 1A and 1B) may be removably inserted into an opening 80 formed in the housing 81. The pin 59 may include an opening, e.g., through hole 61, that allows attachment of the pin to objects such as clothing. To provide some degree of positive retention of the pin 59 within the opening 80, a spring plunger 76 (e.g., a set screw with a spring-loaded ball at one end) may be threadably engaged with the housing 81 at threaded hole 83. The plunger 76 may seat within a groove 84 formed on the pin 59 when the latter is fully inserted into the housing 81. In addition to retaining the pin, the spring plunger 76 may provide a positive tactile feel as the pin 59 is inserted and withdrawn from the housing 81.

The switch assembly 58 may further include a switch, e.g., lever switch 74, that may be attached to the housing 81, e.g., with fasteners 86. The switch 74 may be positioned adjacent the pin 59 such that a movable paddle 88 may be displaced by the pin 59 when the latter is inserted into the opening 80. In one embodiment, the paddle 88 may be biased to a first position shown in FIG. 9B (switch is shown exploded from the housing in this view). The first position of the paddle 88 corresponds to the switch 74 being electrically closed so that circuits (e.g., electrical circuits schematically illustrated in FIG. 9B by reference numeral 69 and communication circuits 71 of FIG. 1A) in the vehicle 50 may be active. However, when the pin 59 is inserted into the opening 80, the pin may force the paddle 88 to a second position (represented in broken lines in FIG. 9B) that opens the switch to disconnect the electrical circuits of the vehicle 50.

In one embodiment, the switch 74 is a model D2F snap action switch manufactured by Omron Electronic Components of Schaumburg, Ill., USA. However, other mechanical switches are certainly possible without departing from the scope of the invention. Moreover, other types of switches, e.g., a magnet or a hall effect sensor, or a combination of sensors/devices, could be used to achieve vehicle circuit activation/deactivation. For example, a proximity switch could be used wherein, when the switching element (e.g., the pin) is in close proximity to the robotic vehicle, the robot is deactivated, and when the switching element is separated from the robotic vehicle, the latter is activated. In yet other embodiments, the switch could be activated by a low power RF signal. As a result, the vehicle could be delivered to its intended site and, at the appropriate time, activated by transmission of the RF signal.

During transport, the pin 59 may be located in the opening 80 and also attached to clothing of the operator (or to most any another mounting provision) via the through hole 61. As a result, the vehicle 50 may be suspended from the operator's person until it is ready for use. To deploy the robotic vehicle 50, it may simply be grasped and pulled free of the clothing whereby the pin 59 is withdrawn from the opening 80. Withdrawal of the pin 59 may activate the electrical circuits of the vehicle 50, after which the vehicle may be delivered to its intended target region, e.g., thrown or dropped. Thus, the robotic vehicle 50 may be deployed quickly without the need for a separate activation step.

The vehicle may be delivered in a variety of ways. For example, it may be dropped from above the surveillance site, either from a fixed location or from a moving platform, e.g., ground or air vehicle. Alternatively, the vehicle could be thrown or launched from a location adjacent the surveillance site. Tests were conducted using a vehicle weighing about 0.9 lbs and configured as generally illustrated in FIGS. 1A and 7A. In these tests, the vehicle 50 did not incur any substantial structural damage (i.e., damage to the chassis, shell, and drive train) when dropped from a distance of about 9 meters. Although chassis and drive train integrity were maintained, some of these drops did result in tire delamination, while others resulted in damage to some electronic components (i.e., the receiver crystal and video transmitter). However, it is believed that minor changes to the tire manufacturing process (to achieve better adhesion between the polyurethane materials and the hub) and more rugged electronics and electronics mounting provisions will ameliorate or eliminate these issues.

In other tests, the vehicle 50 (also generally configured as shown in FIGS. 1A and 7A), was thrown laterally a distance of about 30 meters onto a concrete surface without incurring operation-limiting damage.

Vehicles in accordance with embodiments of the present invention may incorporate additional features that assist in storage, delivery, and operation of the vehicle. For example, while not illustrated herein, an optional latching mechanism could be provided to permit storage of the tail 54, and optionally the antennae 56, when the robotic vehicle 50 is stored or being carried. In one embodiment, the tail 54 could be wrapped around the body portion 51 of the vehicle 50 (generally flush thereto) and latched with a simple catch. This catch could be of most any configuration that is capable of holding the tail 54 in place including, for example, a magnet or a wedge-and-groove structure. In one embodiment, the tail 54 could deploy via jarring action resulting from sudden impact, e.g., during delivery. Alternatively, an active latch could be provided. An active latch could be powered internally, such as from a solenoid or a magnetic coil, and could be capable of freeing the tail 54, e.g., releasing a magnetic latch. The catch could, alternatively, be connected to one or both wheels such that, when the wheels rotate, the catch releases.

FIG. 10 illustrates an exemplary remote computer 300 that may be used to wirelessly transmit instructions to, and receive data from, the robotic vehicle 50. The computer 300 may include antennae 302 to wireless communicate with the vehicle, and a screen 304 to display information, e.g., camera views, pertaining to vehicle operation. Miscellaneous controls, e.g., a joystick 306 and buttons 308, may also be provided to remotely control the vehicle 50.

In one embodiment, the vehicle 50 may receive commands from the remote computer 300 via an onboard 4-channel R/C receiver (two channels for motor control and two for other functions). To process commands and video, the vehicle may include an 8-bit, 16 MHz microcontroller (e.g., model Atmega128 by Atmel Corp. of San Jose, Calif., USA).

Robotic vehicles in accordance with embodiments of the present invention provide a small yet rugged platform suitable for a range of tasks including covert reconnaissance and surveillance. The unitary vehicle chassis, as described above, may provide substantial vehicle rigidity as well as reduced attachment points and improved protection of onboard equipment. The vehicle may further include cushioning wheel assemblies that absorb shock loads incurred during operation, e.g., during vehicle landings. Still further, clutch assemblies such as those described above, may be provided to protect sensitive mechanical drive train components of the vehicle from excessive torque inputs.

The complete disclosure of the patents, patent documents, and publications cited in the Background, the Detailed Description of Exemplary Embodiments, and elsewhere herein are incorporated by reference in their entirety as if each were individually incorporated.

Illustrative embodiments of this invention are discussed and reference has been made to possible variations within the scope of this invention. These and other variations, combinations, and modifications of the described embodiments will be apparent to those skilled in the art without departing from the scope of the invention, and it should be understood that this invention is not limited to the illustrative embodiments set forth herein. Accordingly, the invention is to be limited only by the claims provided below, and equivalents thereof.

What is claimed is:

1. A robotic vehicle comprising:
an elongate body defining a body axis, the body comprising two ends;
a tire coupled and axially fixed to each end of the body, the tires configured to elastically deform and dissipate impact loads over substantially any angle of impact of the vehicle on a landing surface;
one or more motors for rotating the tires;
a flexible tail member coupled to the body and extending outwardly therefrom;
a video camera positioned within the body, the video camera configured to transmit data; and
a switch assembly including a switch enclosed within the body, the switch operable to selectively activate electrical circuits within the robotic vehicle, wherein the switch assembly comprises a user-removable pin comprising a cylindrical pin body and a head, the head defining an aperture for connecting the pin to foreign objects, and wherein the body of the vehicle defines an opening for receiving the pin body, the opening extending in a direction transverse to the body axis, whereby when the pin is inserted into the opening of the body, the head of the pin protrudes out of the body of the vehicle.

2. A robotic vehicle comprising:
an elongate body comprising a unitary chassis formed from a single piece of material and a shell covering the chassis, the shell presenting a cylindrical external surface, wherein the chassis defines pockets for receiving and securing components therein;
a wheel assembly coupled to each end of the body, wherein each wheel assembly comprises a tire, each tire configured to elastically deform in both radial and axial directions to dissipate impact loads resulting from substantially any angle of impact of the vehicle on a landing surface;
a pair of drive motor assemblies coupled to the body; and
first and second clutch assemblies, wherein the first clutch assembly connects a first drive motor assembly to the wheel assembly located at a first end of the body, and the second clutch assembly connects a second drive motor assembly to the wheel assembly located at a second end of the body, the clutch assemblies operable to permit slippage of the associated wheel assembly relative to the associated drive motor assembly when a predetermined torque is reached between the wheel assembly and the drive motor assembly, the drive motor assemblies and the clutch assemblies secured within the pockets of the chassis and covered by the shell.

3. The vehicle of claim 2, wherein each clutch assembly further comprises:
a driven gear;
a clutch bell proximal the driven gear; and
a biasing member operable to control frictional engagement of the clutch bell with the driven gear.

4. The vehicle of claim 3, wherein the biasing member comprises a spring washer.

5. The vehicle of claim 2, wherein each tire has an inboard portion and an outboard portion, the inboard portion comprising a first material, and the outboard portion comprising a second material.

6. The vehicle of claim 5, wherein the second material is co-molded with the first material and each wheel assembly further comprises a hub for coupling to its respective clutch assembly.

7. The vehicle of claim 2, wherein each tire has an inboard portion and an outboard portion, the outboard portion having a variable diameter that decreases towards an outboard direction.

* * * * *